US006630812B1

(12) United States Patent
Davis

(10) Patent No.: US 6,630,812 B1
(45) Date of Patent: Oct. 7, 2003

(54) STANDARD HIGH VOLUME BATTERY CHARGER

(75) Inventor: Laurel B. Davis, Andover, KS (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 10/137,587

(22) Filed: May 2, 2002

(51) Int. Cl.[7] .................................................. H02J 7/00
(52) U.S. Cl. ...................................... 320/116; 320/117
(58) Field of Search .............................. 320/116, 117, 320/118, 119, 112, 120; 307/66, 64; 429/50, 120

(56) References Cited

U.S. PATENT DOCUMENTS 5,204,609 A * 4/1993 Alisauski .................. 320/107
5,780,991 A * 7/1998 Brake et al. .................. 320/6
6,375,344 B1 * 4/2002 Hanson et al. .............. 364/708

* cited by examiner

Primary Examiner—Lawrence Luk
(74) Attorney, Agent, or Firm—Suiter West PC LLO

(57) ABSTRACT

The present invention is directed to a standard high volume battery charger that is capable of applying a seasoning cycle to batteries disposed within it as well as display battery measurements on a monitor through a user interface serial port. This battery charger comprises an enclosure including a power supply, a user interface connector and disposed with at least one sub-module comprising a mode control board and battery cavity. The mode control board has a user interface front panel, which is comprised of a battery section, battery status panel and a system status panel. The system status panel has disposed upon it two switches, that control the operation of the sub-module, which enable a user to select the application of a seasoning cycle to the batteries in the charger. The user interface serial port is capable of communicatively coupling an information handling system to the charger and allowing for the display, on a monitor of the information handling system, of up to eight battery measurements at one time.

19 Claims, 6 Drawing Sheets

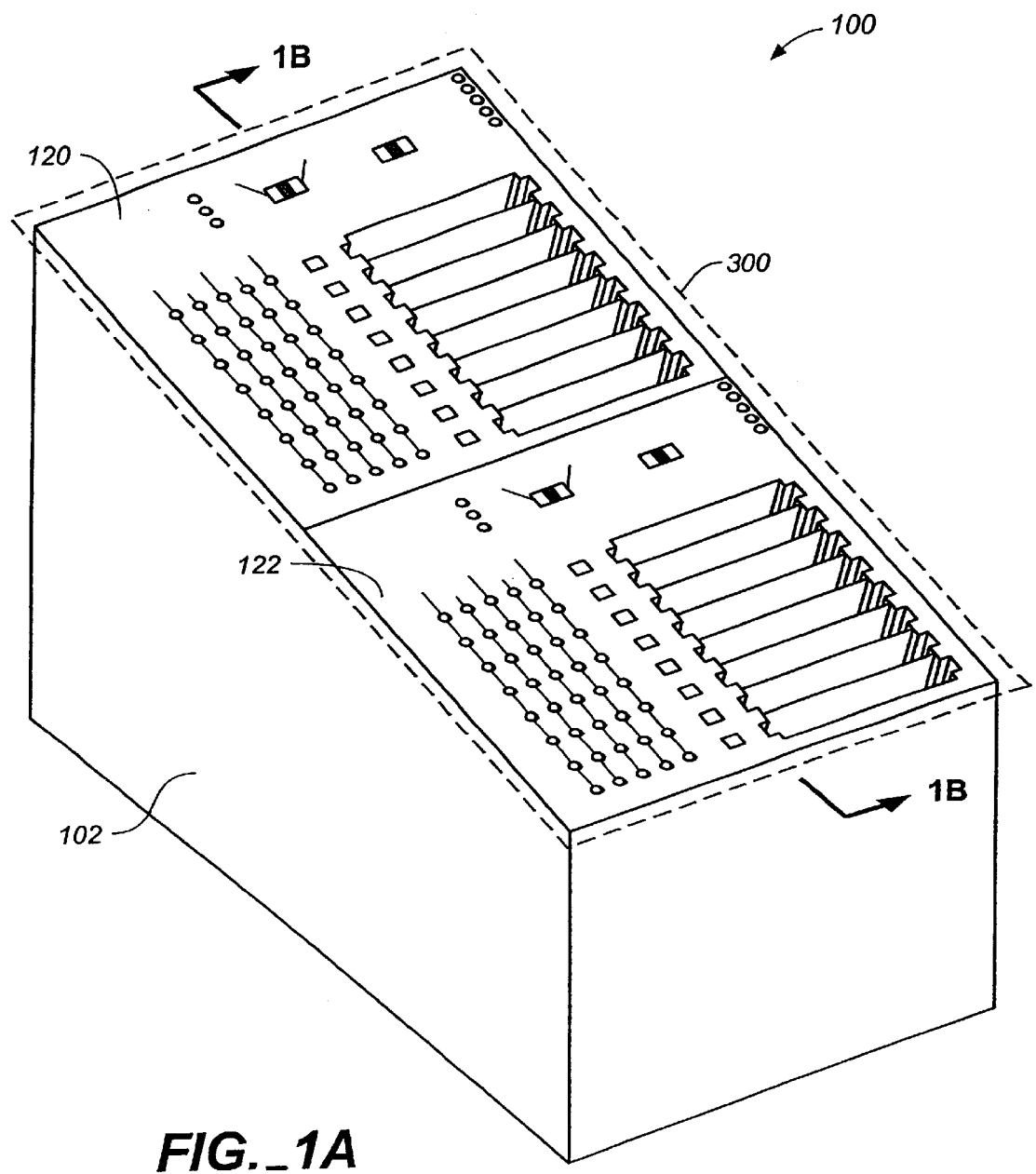
FIG._1A

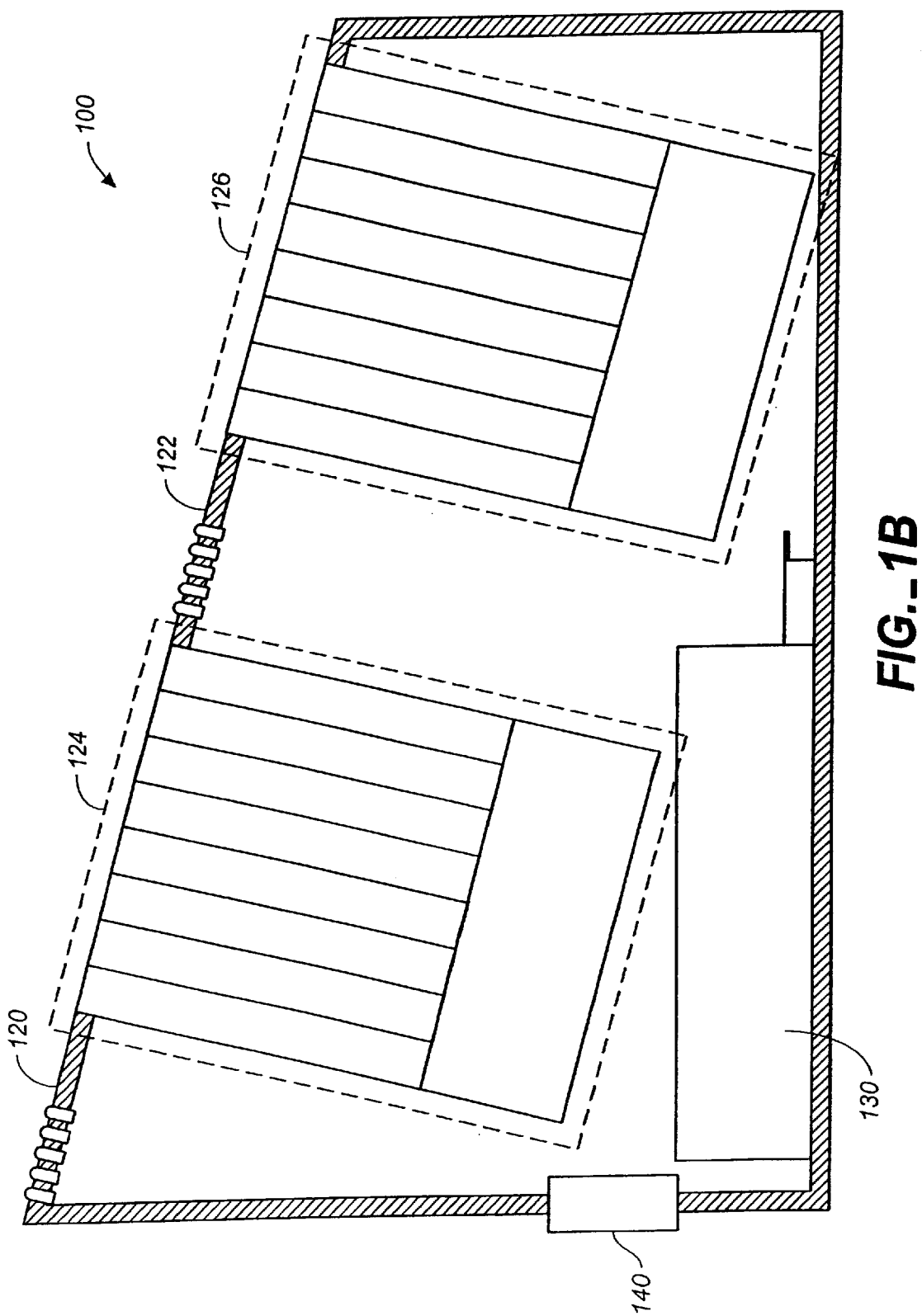
FIG._1B

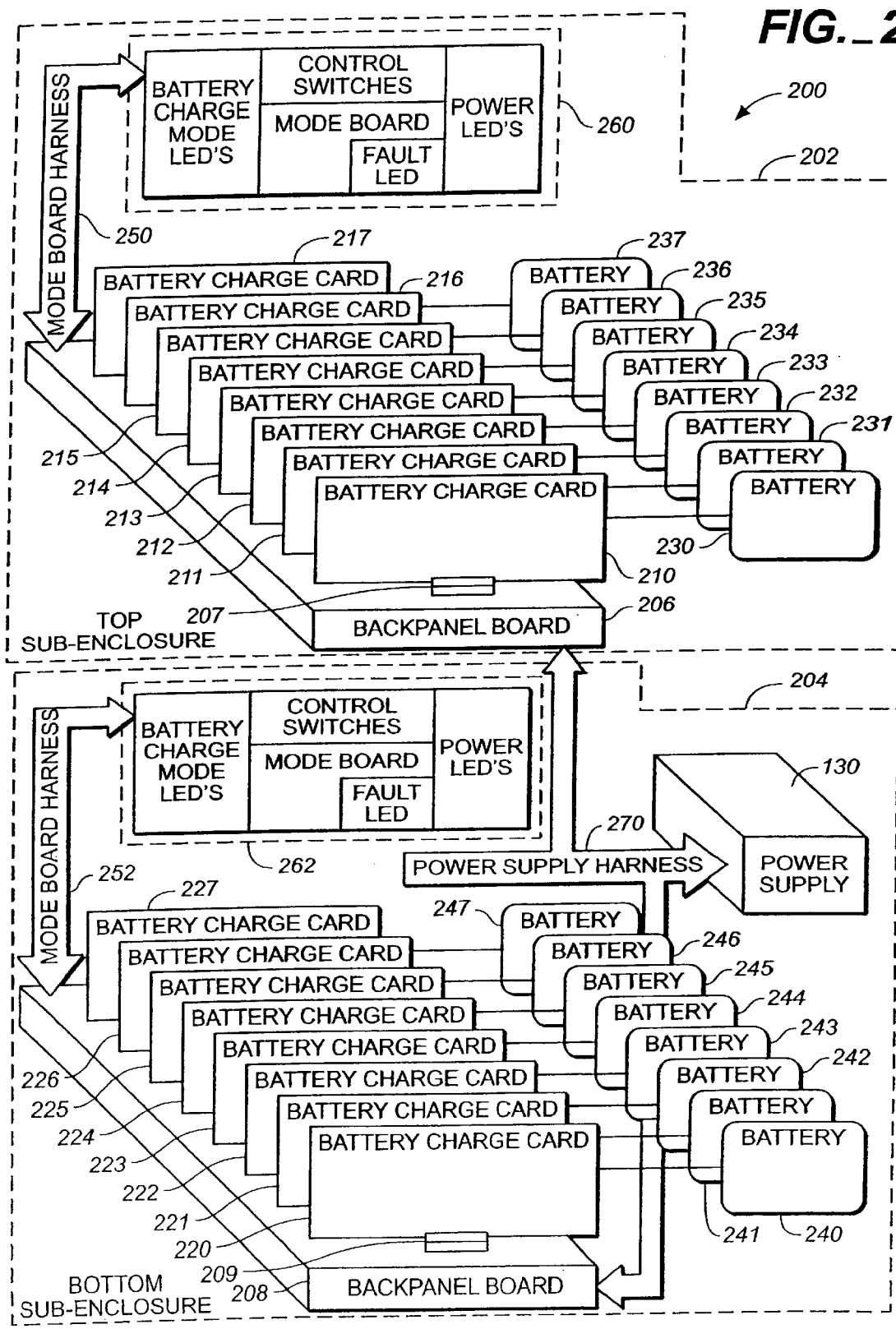
FIG._2

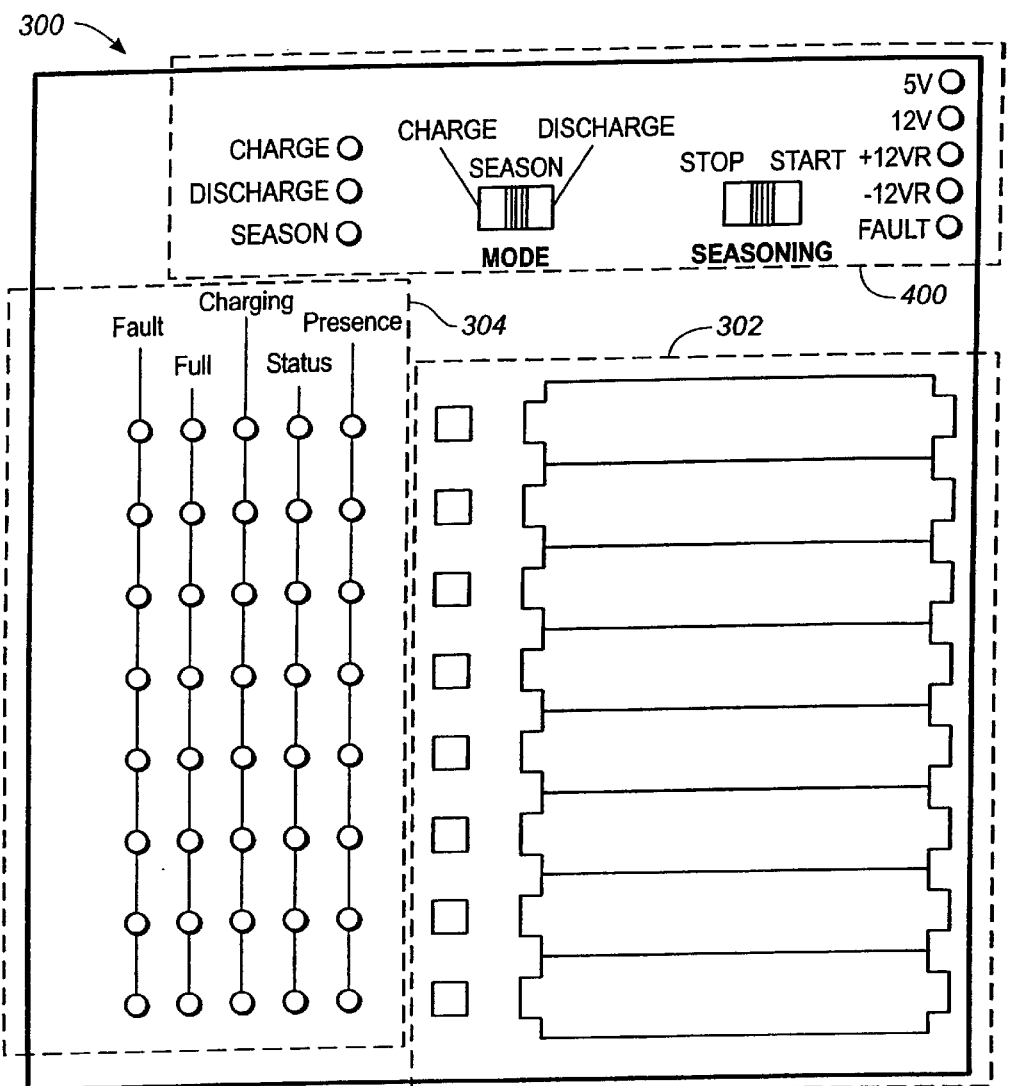
FIG._3
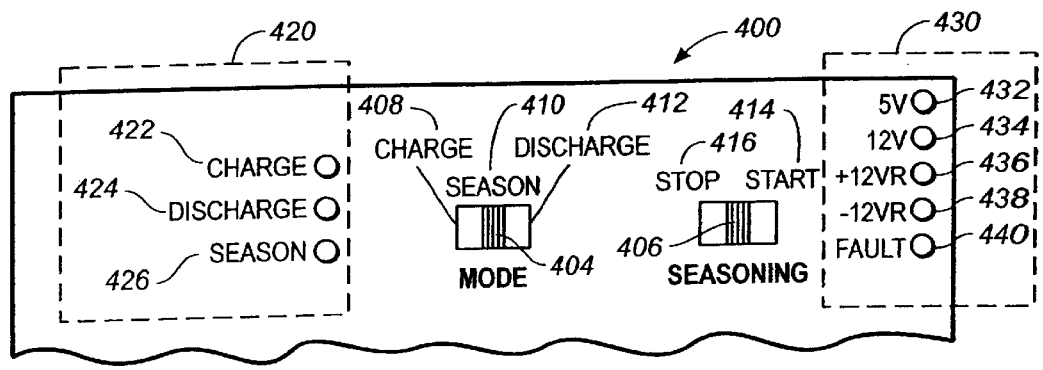
FIG._4

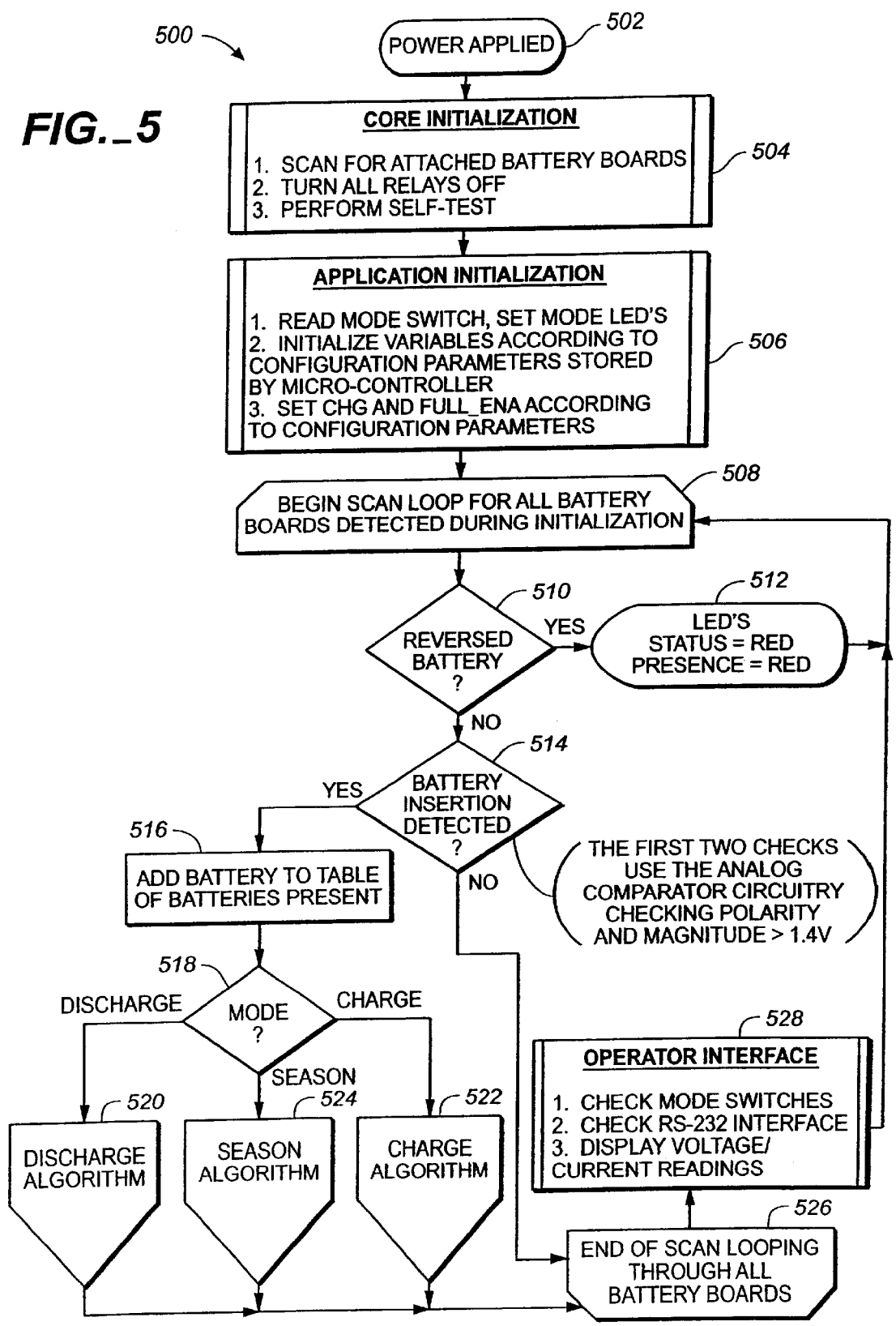
FIG._5

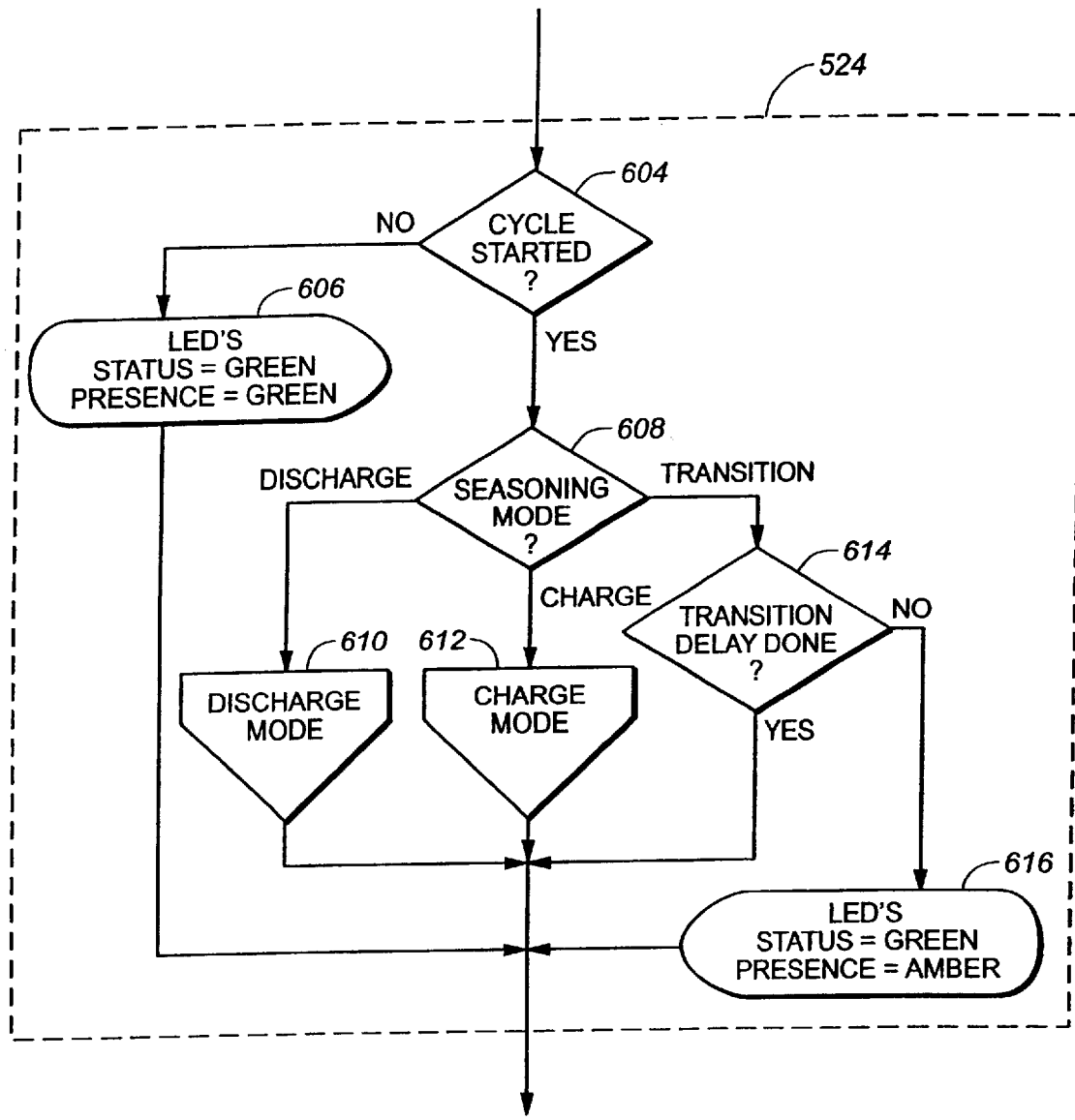
FIG._6

STANDARD HIGH VOLUME BATTERY CHARGER

FIELD OF THE INVENTION

The present invention generally relates to the field of battery chargers and particularly to a system and method for charging and applying a seasoning cycle to a battery used in a storage system enclosure controller assembly, such as a redundant array of independent disks controller assembly, or the like, and displaying battery measurements on a monitor of a peripheral information handling system communicatively coupled to the battery charger.

BACKGROUND OF THE INVENTION

Optimizing the performance and reliability of standard high volume platforms may become of increasing importance as new technology continues to provide greater power and capability within single operational units. For instance, the widespread use of redundant array of independent disks (RAID) systems, just a bunch of disks (JBOD) systems and the like may provide easily accessible solutions to data storage and protection problems. Moreover, increasing utilization by businesses and individuals who depend on their proper functioning to accomplish a variety of tasks have increased demands for reliability and ease of use.

Generally, RAID systems contain a controller assembly. This controller assembly provides for the communicative linkage of the RAID system to an operator utilizing peripheral systems or devices. RAID controller assemblies require a power source, without which the controller assembly does not function and, therefore, the RAID system is non-operational. Many RAID controller assemblies employ batteries as a power source, such as lead-acid batteries, which have to be charged before integration within a system in order to meet manufacturing test and qualification standards. For lead-acid batteries this charging process is also known as the "forming process" and enables the batteries to meet specific requirements. However, the charging or forming process may be further enhanced by the use of a process known as a "seasoning cycle". The seasoning cycle involves the discharging and re-charging of the batteries in order to promote more complete formation of their charge holding capabilities. In lead-acid batteries the application of a seasoning cycle promotes more complete formation of the lead plates contained within.

Previous products, known as gang chargers, have been capable of charging up to sixteen batteries at a time. A battery charger capable of charging and applying a seasoning cycle, across sixteen batteries, may provide numerous advantages over conventional battery chargers. For example, lead-acid batteries with more complete lead plate formation have an enhanced crystalline structure, which may increase their capability to accept a charge quicker and hold a charge. Additionally, a seasoning cycle may result in a lead-acid battery having a longer life span and may be useful in troubleshooting or battery characterization, which may require batteries be discharged. The application of a seasoning cycle is of particular importance when employing batteries for use in field depots or other remote locations where the ability to maintain battery "freshness" (charge on a battery) before shipping out, during transit and while stocked as inventory has been problematic.

A battery charger capable of displaying battery measurements for multiple batteries being charged within the battery charger (up to eight batteries) may provide a distinct advantage. It is known for a battery charger to display battery measurements, however, the display is typically of one set of measurements from one battery per screen. An operator of the battery charger may save time by having the ability to keep track of multiple batteries in one screen location as well as allow for easier troubleshooting in the event of a problem with a battery within the battery charger.

Therefore, it would be desirable to have a system and method for charging, applying a seasoning cycle and displaying battery measurements, wherein such a system and method may be employed upon lead-acid batteries.

SUMMARY OF THE INVENTION

Providing a portable, space efficient way for an operator to perform multiple functions upon rechargeable batteries while reducing the complexity and cost of providing such capabilities is paramount. The addition of a seasoning cycle capability to the battery charger may allow for cost reduction through an ability to extend battery life and maintain operational status of devices, such as a standard high volume controller assembly. This may keep devices, that require such power sources as batteries, active and operational for longer periods of time which may result in increased productivity and fewer man hours spent on maintenance. The battery charger may be configured for a specific battery and include sufficient flexibility of design to allow for acceptance of a variety of battery styles and sizes.

Accordingly, the present invention is directed to a standard high volume battery charger capable of charging, applying a seasoning cycle and displaying battery measurements. The battery charger apparatus may perform its functions upon a variety of batteries, such as a lead-acid battery which may be used as a power source for control assemblies of standard high volume platforms, such as RAID systems and the like. The apparatus includes an enclosure comprising at least two sub-modules, which include a system status panel, a battery status panel and a battery cavity that may charge, season and display measurements of a plurality of batteries as directed by operator input. The battery charger may contain reverse polarity detection/protection circuitry and the hardware and software configurations may be sufficiently flexible to accept a variety of different battery styles and sizes.

It is to be understood that both the forgoing general description and the following detailed description are exemplary and explanatory only and are not necessarily restrictive of the invention as claimed. The accompanying drawings, which are incorporated in and constitute a part of the specification, illustrate an embodiment of the invention and together with the general description serve to explain the principles of the invention.

BRIEF DESCRIPTION OF THE DRAWINGS

The numerous advantages of the present invention may be better understood by those skilled in the art by reference to the accompanying figures in which:

FIG. 1A is an isometric view of an exemplary embodiment of the present invention wherein a standard high volume battery charger is shown.

FIG. 1B is an illustration of an exemplary embodiment of the present invention wherein a cross section view of the standard high volume battery charger is shown;

FIG. 2 is an illustration of an exemplary embodiment of the present invention wherein a block diagram of the standard high volume battery charger sub-modules and their functional components are shown;

FIG. 3 is an illustration of an exemplary embodiment of the present invention wherein a front panel of the standard high volume battery charger is shown;

FIG. 4 is an illustration of an exemplary embodiment of the present invention wherein an individual system status panel disposed on the front panel of the standard high volume battery charger is shown;

FIG. 5 is a flow diagram depicting an exemplary method of the present invention for the selection, by an operator of the standard high volume battery charger, of a seasoning cycle to be applied to a battery; and FIG. 6 is a flow diagram depicting an exemplary method of the present invention for the application of the seasoning cycle to the battery.

DETAILED DESCRIPTION OF THE INVENTION

The present invention embodies providing for an operator a single system and method for charging and applying a seasoning cycle to a variety of rechargeable batteries, such as lead-acid batteries and the like, which may be used as a power source in storage controller assemblies, such as RAID controller assemblies, and the like. The hardware and software of the present invention may be configurable to accept a variety of styles and sizes of batteries. The present invention may be portable which makes it ideal for use in remote locations and by combining these two applications the present invention reduces hardware needs, that in turn may reduce cost and storage needs. Further, the present invention provides for an interface with a peripheral device for the display of battery measurements. While such display systems are known, the present invention may be capable of displaying measurements for multiple batteries in one display, which may provide a distinct advantage over previous systems. Another possible advantage of the present invention may be circuitry, which enables reverse polarity detection of batteries in the system and protection for the invention against any harmful effects such reverse polarity may have.

Reference will now be made in detail to the presently preferred embodiments of the invention, examples of which are illustrated in the accompanying drawings.

Referring to FIGS. 1A and 1B, a standard high volume battery charger is shown. The standard high volume battery charger, generally designated by reference numeral 100, includes an enclosure 102, a front panel 300 (described in FIG. 3), a first sub-module 120 with a first battery cavity 124, a second sub-module 122 with a second battery cavity 126, a power supply 130 and an interface port 140.

Enclosure 102 may be configured with a plurality of sides to enable the proper functioning of the standard high volume battery charger. The top side of enclosure 102 contains the front panel 300 (described in FIG. 3), which is sloped at approximately a 15 degree angle. Standard high volume battery charger 100 may serve as a portable device allowing it to service batteries in remote locations. Enclosure 102 provides protection for the standard high volume battery charger 100 from physical and environmental damage. For instance, dust and water are kept out of the circuitry and stresses from being transported are minimized. The materials that comprise enclosure 102 may include plastic, steel, aluminum and the like. The use of steel, and materials like it, provide an electromagnetic interface shield protecting the circuitry from such harmful interference. Additionally, use of very tactile magnesium may enable enclosure 102 to assist in dampening vibration transfer to the internal circuitry and battery connections (as will be described later).

Standard high volume battery charger 100, as shown, contains first sub-module 120 and second sub-module 122 located within enclosure 102. Each sub-module extends from the top towards the bottom of enclosure 102. First sub-module 120 is located near rear side of enclosure 102 with the second sub-module disposed below it. The sub-modules are described in detail in FIG. 2.

Enclosure 102 contains a power supply 130. The source of power may be internal or an external connection. In the present embodiment power supply 130 is an auto-ranging power source with the following ratings: 1) AC Voltage: 90 through 228 VAC, 2) AC Frequency: 50 to 60 Hz, 3) AC Current: 3 to 6 Amps. Power supply 130 is located inside the enclosure near the rear of left side 114, and is latched in place with the LSI lever and rail. Power supply 130 may be removable from enclosure 102. It is contemplated that a variety of power supplies may be employed without departing from the spirit and scope of the present invention.

The standard high volume battery charger 100 operates in an environment where the working temperature range (dry bulb) is 5° C. through 40° C. (the maximum dry bulb temperature shall be 3.3° C. per 1000 m above 500 m) and the working relative humidity range is 5% through 95% non-condensing. It may operate in environments with temperatures ranging from 0° C. through 70° C. Thermal management will be used to keep standard high volume battery charger 100 within 10° C. of ambient temperature throughout the charger. Standard high volume battery charger 100 is designed with a minimum amount of harnesses, daughter boards and other use of connectors to the extent possible. Proper airflow is provided, for thermal management, by reserving four inches of clearance in the rear and sides for airflow purposes. This helps ensure that the maximum temperatures for all parts are not exceeded. Other construction specifications allowing for a wider range of operating conditions and thermal management systems may be employed as contemplated by one of ordinary skill in the art.

Standard high volume battery charger 100 is designed and configured for a specific 4 volt, 2.5 Amp-hour sealed lead-acid (SLA) battery in a two-cell series construction. It is contemplated that standard high volume battery charger 100 have sufficient flexibility to enable its use with other battery types (e.g., nickel cadmium, lithium ion and the like) and sizes with a minimum of modifications. Depending on the different battery characteristics, these modifications may only be software configuration changes or configuration parameter changes. Physically different battery sizes from a 1.5 Amp-hour single cell up to three-cell 6 volt 5 Amp-hour may require hardware changes, but the partitioning of the battery charger cards (BCC) (described in FIG. 2) and the battery mounting (described in FIG. 2) allows for a relatively easy swap out of the mounting hardware to accommodate such changes.

Enclosure 102 has general overall dimensions, which enable it to accommodate the features and functions needed of standard high volume battery charger 100. The preferred embodiment shown has general overall dimensions of 11"W×24"D×16"H and weight, without batteries is less than 30 pounds (lbs.) to enable its ease of use and transportation. These dimensions and weight specification may be changed by one of ordinary skill in the art without departing from the scope and spirit of the present invention.

To enable communication with peripheral devices enclosure 102 includes interface port 140. There may be more than one interface port included to enable communication with multiple peripheral devices. The communicative coupling may be accomplished by the use of a universal serial bus port, SCSI port, SCSI III port, Infrared port, Fiber Optic Channel port, and the like. Preferably, interconnection with peripheral devices will be provided through an RS-232 compatible DB-9 interface port 140 using a standard PC pin-out. This allows a standard null modem cable to connect a personal computer (PC), or other information handling system, for automation of the system, such as configuring the seasoning cycles and other battery charging parameters. Configurable parameters and their default values are listed below in Table 1:

System dependent parameters include the MDT and BSM parameters (shown in Table 1). The MDT parameter avoids cycling relays on and off if the connector contacts "bounce" during insertion. Thus, this parameter is set based on empirical observation of the LED's flickering between battery presence/absence states as the batteries are connected. The BSM parameter is a bit-wise representation of fully functional battery charger cards (battery charge card) in slots 0 through 7 of the system (as described in FIG. 2 below). This parameter may require change when a BCC becomes inoperative or is returned to service. This parameter is used by firmware to optimize internal algorithms.

TABLE 1

| Parameter | Cfg Name | Default Value | Description of Use |
| --- | --- | --- | --- |
| Number of Cycles | NOC | 3 | Number of seasoning cycles |
| Transition delay time | TDT | 300 SEC | Time between discharge and charge |
| Display Interval Time | DIT | 15 SEC | Delay between updates in monitor mode |
| Battery Discharge Limit | BDL | 3400 Mv | Voltage at which discharge is complete |
| Battery present lower limit | BPL | 2800 Mv | Minimum value to enable battery charge/discharge |
| Battery present upper limit | BPU | 5240 Mv | Maximum value to enable battery charge/discharge |
| Measurement debounce delay time | MDT | 100 Ms | Interval between battery voltage measurements for insertion detection and end-of-cycle hysteresis during discharge. |
| Battery Slot count | BSC | 8 | Maximum number of battery slots operational |
| Battery Slot Mask | BSM | 0xFF | Bit-wise definition of operational battery slots |
| Current Cycle | CCY | 0 | Current cycle of seasoning. Read-only parameter |
| Charge Algorithm | CHG | 0xFF | Defines algorithm in use on battery charger boards. A 0 in a bit position indicates pulsed current, a 1 indicates two-step voltage for the corresponding battery slot. |
| Full LED Hold-Off | FHO | 30 min. | Hold-off period, in minutes, from first FULL indication by battery charger chip until the LED is enabled. Applies only to pulse mode algorithm. |

Other values may be added for calibration or system setup, which are not part of the user configurable parameters shown above.

All values listed in the table are stored as integer values. Operator display of these values is converted into other units (Volts or Minutes) for better readability. These conversions include such units as part of the display. Any other conversions, as contemplated by one of ordinary skill in the art, may include such units as part of the display.

The charge algorithm (CHG) is a status byte only and not settable through the LOAD command (discussed below). This parameter works in conjunction with the hardware shunt option at J03 as follows:

1. J03 pins 1 and 2 connected—BCC (battery charge card) STATUS register bit 7 will read 0 and the charge algorithm will be Pulsed Current or two-Step Current. The CHG parameter will be 00 if all eight boards are configured this way.
2. J03 pins 2 and 3 connected—BCC_STATUS register bit 7 will read a logical 1 and the Two-Step Voltage algorithm will be used. If all eight boards are configured this way, the CHG parameter will be FF.

Configuration of the standard high volume battery charger 100 may depend on the recommendations from the battery manufacturer for the particular battery being charged as well as operator preferences. The operator display of values listed in the table may be converted to other readable units as may be contemplated by one of ordinary skill in the art.

The CHG, CCY and BSC parameters (shown in Table 1) are automatically set in the standard high volume battery charger 100. BSC is derived from BSM (shown in Table 1), CHG depends on the board configuration shunt and CCY is strictly a software status value.

Battery dependent parameters, described in Table 1, include the NOC, BDL, BPL and BPU. The NOC is dependent on the recommendations from the battery manufacturer concerning the particular battery being placed into standard high volume battery charger 100. The BDL parameter is recommended to be 1.7 Volts per cell for lead-acid batteries, but depends on the discharge rate being used. The recommended Volts per cell value may vary in order to accommodate a variety of batteries. BPL distinguishes batteries that have been discharged completely, which the user may not wish to re-charge. This value may need to be lower for batteries that have been in service in the field, or higher in manufacturing to identify anomalies in batteries that have just been through stand loss associated with out-of-service storage. BPU accommodates batteries that display capacitive effects from poor service life conditions. It is understood that the naming and description of the use of these parameters is exemplary and may be altered to accommodate other specifications as may be contemplated by one of ordinary skill in the art.

The user dependent parameters, described in Table 1, include TDT and DIT. TDT allows the operator to recognize that all batteries have reached the end of a charge (discharge) cycle before discharging (charging). This may allow the operator to monitor one part of the seasoning process and give the operator ample opportunity to issue the MONITOR command (discussed below). The DIT parameter is used to control the frequency of output to the serial port when the monitor command is in effect. If this is just for routine status and is not being logged, the default value gives good resolution to see changes in the voltage/current for each battery. If finer resolution is desired, the DIT parameter can be reduced. If the only intent is to see each battery as it approaches the end of the charge cycle, DIT can be increased up to the TDT value.

Standard high volume battery charger 100 of the current embodiments may use two of the three charge algorithms allowed by the battery charger chip which is employed, two-step voltage control and pulsed current charging. This chip is used to regulate the voltage and current used to charge the batteries. A "CHARGE" cycle will begin with a mode selection switch (described in FIG. 3) set to charge mode when a battery installation is detected by a micro-controller when the micro-controller is coupled to backpanels 206 and 208. This detection occurs when the voltage measured at the battery terminals is within a window defined by the configuration parameters for battery presence. The default range is approximately 2.8 V to 5.6 V and indicates to standard high volume battery charger 100 that a battery is present is neither, a shorted cell or an open cell. The range of approximately 0 up to 2.8 V indicates a shorted cell, while the range of approximately 5.6 V up to 9 V indicates an open cell. A reading of 9 V up to 12 V indicates that no battery is present. The battery charger chip makes similar decisions, but may take longer to detect. When battery insertion is detected, the relays are switched on to connect the battery charger chip to the battery. Charging is now under control of the battery charger chip and terminates according to the criteria as configured. This configuration is determined by manufacturer specifications. The battery charger chip on standard high volume battery charger 100 is configured with the following operating parameters:

TABLE 2

| | | |
|---|---|---|
| $V_{BLK}$ | 4.944 VDC | Bulk Charge Voltage |
| $V_{FLT}$ | 4.636 VDC | Float Charge Voltage |
| $I_{MAX}$ | 0.750 ADC | Bulk Charge Voltage |
| $T_{HO1}$ | 00:00:36 | Hold-off for Qual Test 2 |
| $T_{HO2}$ | 00:04:30 | Hold-off for Bulk Charge |
| $T_{MTO}$ | 05:00:00 | Timeout for Bulk Charge |

A "DISCHARGE" cycle begins with the mode selection switch set to discharge mode (described in FIG. 4) and battery installation detected by the micro-controller as indicated in the "Charge" cycle above. A load resistor is connected to the battery to discharge. This load resistor approximately discharges at a 400 mA rate. The battery is disconnected from the load resistor when the lower limit of 3.4 V (BDL parameter value) is reached. Note that he battery voltage may rise after the load is disconnected.

The measurement capability of standard high volume battery charger 100 may include both voltage and current. The current is measured indirectly by measuring the voltage across the sense resistor (0.33 ohm) in the charging circuit. Therefore, the charger keeps track of two different analog input sections for the two different scales. The battery voltage reading spans the range of 0 V to +9 V in order to accommodate a dead cell or open cell battery installation. The voltage across the sense resistor is in the range of 0 through 300 mV. The current measurement accommodates a 0 through 999 mA range. The current measurement may be found in the charge mode. The approximate targeted maximum is 750 mA, however, a larger span may be contemplated to accommodate potential design changes to allow for faster charge times.

The voltage to current translation for measuring the charge current requires that a conversion table be employed for each battery channel and a calibration routine be established at least for the initial setup, and perhaps for meeting any on-going service requirements. The desired resolution is 4 mA per bit for the current sense and 35 mV per bit for the voltage sense.

The serial port conforming to RS-232C standards is provided for each mode control board (described in FIG. 2) to allow for configuration parameter changes and monitor functions as described below. A DB-9 male panel connector with the wing pin-out is utilized:

TABLE 3

| Pin | Signal | Function |
|---|---|---|
| 1 | RLSD | Carrier Detection |
| 2 | RXD | Receive Data |
| 3 | TXD | Transmit Data |
| 4 | DTR | Data Terminal Ready |
| 5 | GND | Ground |
| 6 | DSR | Data Set Ready |
| 7 | RTS | Request to Send |
| 8 | CTS | Clear to Send |
| 9 | RI | Not Used |

Hardware handshaking using the RTS/CTS protocol is employed. The RLSD (aka CD) and DTR pins are forced active through a pull-up resistor so that a standard null modem cable can be used with commercial software packages to a standard personal computer or information handling system serial port. The serial port is configured to 9600 baud, 8 bits data, no parity and 1 stop bit. Full-duplex operation is standard and no software flow control support is required.

The serial port interface supports a line-oriented command, echoing keys as they are typed and only processing the input upon receipt of a line termination character. This line termination character is either a carriage return (CR—0x0D) or a linefeed (LF–0x0A). A user prompt of 'SHV>' is provided to indicate that the system is ready to process commands.

Commands supported are LOAD and DUMP to set and retrieve parameters. The parameter names are shown in Table 4 (below) in the Cfg Name column. A third command MONITOR is used to display battery measurements to the screen periodically. A fourth command SEASON is used when the system is configured for seasoning, on the mode selection switch (described in FIG. 4), to start and stop the seasoning process. Syntax errors, illegal values and other commands not understood return an error message to the screen. The Load and Dump command details are shown below:

TABLE 4

| Parameter | Load/Dump | Default Value | Units | Min Value | Max Value | Description of use |
|---|---|---|---|---|---|---|
| BDL | L/D | 3400 | milliVolts | BPL | BPU | Voltage at which discharge is complete |
| BPL | L/D | 2800 | milliVolts | 1300 | BPU-500 | Minimum value to enable battery |
| BPU | L/D | 5240 | milliVolts | BPL + 500 | 9000 | Maximum value to enable battery |

TABLE 4-continued

| Parameter | Load/ Dump | Default Value | Units | Min Value | Max Value | Description of use |
|---|---|---|---|---|---|---|
| BSC | D | 8 | | 0 | 8 | Maximum number of battery slots operational |
| BSM | L/D | 0xFF | | 0x00 | 0xFF | Bit-wise definition of operational battery slots |
| CCY | D | 0 | | 0 | NOC | Current cycle of seasoning |
| CHG | L/D | 0xFF | | 0x00 | 0xFF | Defines algorithm in use on battery charger boards. A 0 in a bit position indicates pulsed current, a 1 indicates two-step voltage for the corresponding battery slot |
| DIT | L/D | 15 | seconds | 0 | 9999 | Delay between updates in monitor mode |
| FHO | L/D | 30 | minutes | 0 | 600 | Hold-off period, in minutes, from first FULL indication by battery charger chip until the LED is enabled. Applies only to pulse mode algorithm |
| MDT | L/D | 100 | milli-seconds | 10 | 1000 | Interval between battery voltage measurements for insertion detection and end-of-cycle hysteresis during discharge |
| NOC | L/D | 3 | | 1 | 250 | Number of seasoning cycles |
| TDT | L/D | 300 | seconds | 60 | 3040 | Time between discharge and charge |

The serial port interface may support commands from a variety of channels and in a variety of forms as contemplated by one of ordinary skill in the art. Preferably, the serial port interface supports commands in the following formats:

Command Parameter [Value]

The command reads as SHV> followed by a command, such as Load, Dump, Season or Monitor, followed by a parameter, such as the battery dependent parameters, system dependent parameters and user dependent parameters, described in Table 1, followed by the value the user chooses to input for the parameter. For example:

SHV>LOAD TDT 228

Such a command instructs the system that the user dependent parameter TDT (transition delay time) is to be set for 228 seconds.

The LOAD command includes the optional 'Value' parameter to set the value for the parameter. The value is converted from the ASCII representation as received form the serial port to the appropriate integer value. Time parameters use the units specified in the default value (milliseconds, seconds or minutes) with no conversion support required. Likewise, voltage values are millivolts so that an integer value can be used to store the parameter, but conversion to volts is not required.

SHV>LOAD BDL 3100⏎

BDL=3100

Note: The (⏎) represents the line termination character (CR or NL)

The DUMP command issues the current setting of the desired parameter on a separate line of text followed by the system prompt in the format shown below:

SHV>DUMP NOC⏎

NOC=10

SHV>

The special parameter "ALL" dumps all defined parameters in the same "name value" format as shown above.

The MONITOR command supports two parameters, a required mode parameter and an optional interval parameter. START and STOP. The START parameter displays a title line and begin the process of displaying the battery status to the serial port using the 'C' format specifier "%08.8ld %04.4d %03.3d %04.4d %03.3d %04.4d %03.3d %04.4d %03.3d %04.4d %03.3d %04.4d %03.3d %04.4d %03.3d %04.4d %03.3d" to print the measurement number, millivolt measurement and milliamp measurement from each channel as shown in the following format: (table design is for formatting purposes only and not necessarily displayed)

| INT 0015 | MV1 | mA1 | mV2 | mA2 | mV3 | MA3 | mV4 | mA4 | mV5 | mA5 | mV6 | mA6 | mV7 | MA7 | mV8 | mA8 |
|---|---|---|---|---|---|---|---|---|---|---|---|---|---|---|---|---|
| 00000001 | 4080 | 142 | 4512 | 687 | 4484 | 721 | 4322 | 716 | 4080 | 443 | 0000 | 000 | 4484 | 553 | 4322 | 141 |
| 00000002 | 4084 | 108 | 4522 | 679 | 4490 | 721 | 4328 | 710 | 4221 | 429 | 0000 | 000 | 4478 | 556 | 4331 | 138 |

The STOP parameter discontinues the display of measurement values to the serial port. The interval value specified in the title line represents the number of seconds that elapse between monitor measurement cycles.

The SEASON command supports two options, START and STOP. This command may only be applicable when the mode select switch is in the 'SEASON' position and is used to start or stop the seasoning process just as the manual operation of the START/STOP switch would. There may be no provision for overriding the mode selection switch through the computer interface, as that would present a conflict with the front panel settings.

Referring now to FIG. 2, a block diagram of first sub-module 120 and second sub-module 122 and their functional components, of enclosure 102, in accordance with an exemplary embodiment of the present invention is shown. First sub-module 120 with first battery cavity 124 is labeled the Top Sub-Enclosure 202 and second sub-module 122 with second battery cavity 126 is labeled the Bottom Sub-Enclosure 204. Each sub-enclosure includes at least one battery charger card, which connects the battery to standard high volume battery charger 100. Preferably, each sub-enclosure comprises a backpanel board, which is connected to eight battery charger cards, power supply 130 (described in FIG. 1) and a mode board.

Each sub-module can contain a plurality of battery charging modules or cards. In the present embodiment we see that each sub-module contains eight battery charger cards or modules. The battery charger cards or modules may be individually configured to act as the analog-to-digital converters or all the analog-to-digital converters may be consolidated onto a mother-board. These battery charger cards or modules are all independent of each other and failure of one will not inhibit the use of the remaining charger cards. As discussed in FIG. 1 the battery dependent parameters, applied through the battery charger cards, are configurable by software to use either a two-step-voltage algorithm or the pulsed current algorithm. The battery charge cards of top sub-enclosure 202 are numbered 210, 211, 212, 213, 214, 215, 216 and 217 and are mounted on back panel board 206 through a right-angle header 207, which includes two positions with friction lock on 0.100" centers. The battery charge cards of bottom sub-enclosure 204 are numbered 220, 221, 222, 223, 224, 225, 226 and 227 and are mounted on back panel board 206 through a right-angle header 209, with the same configuration as right-angle header 207. Other connectors may be employed to fasten the battery charger cards 210 through 217 and 220 through 227 to back panel board 206 and 208, respectively, as may be contemplated by one of ordinary skill in the art. Batteries 230, 231, 232, 233, 234, 235, 236 and 237 of top sub-enclosure 202 and batteries 240, 241, 242, 243, 244, 245, 246 and 247 of bottom sub-enclosure 204 are shown to illustrate the interaction between the batteries and the battery charger cards. Batteries 230 through 237 and 240 through 247 are connected to standard high volume battery charger 100 by placement in the corresponding battery charge card.

Backpanel board 206 and battery charge cards 210 through 217 comprise battery cavity 124. Backpanel board 208 and battery charge cards 220 through 227 comprise battery cavity 126. Top sub-enclosure 202 with battery cavity 124 and bottom sub-enclosure 204 with battery cavity 126 extend down into enclosure 102 of standard high volume battery charger 100, as shown in FIG. 1.

Top sub-enclosure 202 further, comprises a mode board harness 250, which connects backpanel board 206 with a mode control board 260. Bottom sub-enclosure 204 further comprises a mode board harness 252, which connects backpanel board 208 with a mode control board 262. This provides for the communicative coupling of the battery charger cards with the mode control board. Backpanel boards 206 and 208 connect to power supply 130 through a power supply harness 270.

The mode control boards are comprised of at least one panel and a plurality of LED's. Preferably, each mode control board includes a system status panel, a battery status panel, two switches and eight LED's. The two switches are available to select the operating mode and control operation of each charger module, which reside on the mode control card of the mode control board. The eight LED's provide indication of current operating mode as well as system power status and summary status to indicate the overall status of the module. Individual battery status is displayed on LED's in the battery status panel. A preferable embodiment for each mode control board is discussed in detail in FIG. 3.

One of the two identical sections which comprise front panel 300 of standard high volume battery charger 100 is shown in FIG. 3. Front panel 300 is the external user interface surface of the mode control boards and is included on the top side of enclosure 102. Each identical section of front panel 300 comprises three areas: System Status Panel 400 (described in FIG. 4), Battery Section 302 and Battery Status Panel 304. The system status panel contains switches and light emitting diodes (LED's) that apply to the entire sub-module, while battery status panel 304 contains LED's that indicate detailed status of individual batteries. The individual batteries are located in battery section 302, which is the location of battery cavities 124 and 126 (described in FIGS. 1 and 2).

In the preferred embodiment front panel 300 comprises a mode control board, as previously discussed in FIG. 2. Note that in FIG. 1A the preferred embodiment of standard high volume battery charger 100 includes two identical mode boards. Each mode control board provides the user interface relays, through the mode control card, for each sub-module (described in FIG. 2). Each mode control board has a right side, left side, top side and bottom side and is configured into three sections, system status panel 400, which is located on the top right side, battery status panel 304, which is located along the left side and adjacent to battery section 302, which is located along the right side but below system status panel 400. Note that battery section 302 is where battery cavities 124 and 126 are located and as such may not comprise a panel but instead an opening for insertion of the batteries into the battery charger cards. Battery section 302 is communicatively coupled to system status panel 400 and battery status panel 304 through the mode control card and the battery charge card respectively. Front panel 300 has general overall dimensions that enable it to comprise the top side of enclosure 102, which may vary as contemplated by one of ordinary skill in the art.

Battery status panel 304 may contain a plurality of LED's for providing status information on individual batteries. In the preferred embodiment battery status panel 304 contains forty LED's that indicate detailed status information of individual batteries. As shown, each battery has five status indicator LED's. Three of the status indicators—"Charging", "Full" charge and "Fault"—are driven by the battery charger chip battery charger chip (discussed in FIG. 1) while the other two status indicators—"Status" and "Presence"—are driven by a micro-controller and indicate reverse polarity and discharge in progress. The "Full" charge LED is a status input of the micro-controller for use in seasoning cycles. From the far left side of each mode control board and proceeding to the right side, the status indicators are arranged starting with "Fault" then "Full" then "Charging" then "Status" and last is "Presence". Each status indicator, "Charge", "Full", "Fault", "Status", and "Presence" has a vertical column of eight LED's that are situated from the bottom left side of each mode control board going towards the top left side in straight and parallel lines. Horizontally, the LED's form straight line groupings of the five status indicator LED's, which directly align, horizontally, with the individual battery charger cards located in battery cavities 124 and 126 contained within battery section 302. Definitions of LED status indicators for battery states are shown below in Table 5.

TABLE 5

| BATTERY STATUS | FAULT (AMBER) | CHG (GREEN) | FULL (GREEN) | BSTAT (Bi-color) | BPRES (Bi-color) |
|---|---|---|---|---|---|
| Waiting for battery, charge mode | A | 0 | 0 | 0 | 0 |
| Waiting for battery, discharge mode | A | 0 | 0 | G | 0 |
| Waiting for start switch (season) | A | 0 | 0 | G | G |
| Reverse Polarity | A | 0 | 0 | R | R |
| Dead cell insertion (<2.8V) | A | 0 | 0 | R | A |
| Open cell insertion (5.6V–9.0V) | A | 0 | 0 | A | A |
| Discharge mode | A | 0 | 0 | A | G |
| Discharge Complete | A | 0 | 0 | R | G |
| Seasoning cycle transition delay | A | 0 | 0 | G | A |
| Pre-charge Qualification | 0 | F | 0 | 0 | G |
| Fast Charge Mode | 0 | G | 0 | 0 | G |
| Float Charge | 0 | V | 0 | 0 | G |
| Fully Charged | 0 | V | V* | G | G |
| Out of Temperature range | F | P | P | 0 | G |
| Charging Fault | A | P | P | 0 | G |

A = Amber
G = Green
R = Red
F = 3 Hz flash rate (Fast Flash),
P = Previous state When operating with Pulsed Current Charge Algorithm
V = Variable flash rate depending on battery charge state
V* = Opposite state of V Referring now to FIG. 4 a system status panel 400 is shown. It should be understood that system status panel 400 while shown here alone is itself disposed upon front panel 300 as described in FIG. 3. System status panel 400 may include a plurality of switches. In the preferred embodiment system status panel 400 includes a MODE selection switch 404 and a SEASONING switch 406, which define the operation of the standard high volume battery charger 100. These two switches are controlled by user input, either manually or through the interface port 140 user interface. Mode selection switch 404 is located in a bottom left side middle area of system status panel 400 and is visually identifiable by the word MODE attached to or integrated with system status panel 400 directly beneath mode selection switch 404. It is contemplated that mode selection switch 404 may be located in other areas of system status panel 400, front panel 300 and standard high volume battery charger 100. Mode selection switch 404 is a three position switch that defines whether the battery will be charged, by placing the switch in the CHARGE 408 position, subjected to a seasoning cycle, by placing the switch in the SEASON 410 position or discharged, by placing the switch in the DISCHARGE 412 position. Mode selection switch 404 is capable of seating in any one of these three positions. Identifying the position of mode selection switch 404 is accomplished by visual indicators on the system status panel and associated with the mode selection switch. The words CHARGE and DISCHARGE are attached to or integrated with the system status panel 400, positioned above and to the left and above and to the right, respectively, of the mode selection switch 404. Both are associated by lines, which lead from the charge or discharge position with which they are associated. It is contemplated that other words and methods of association can be used. The word SEASON is attached to or integrated with system status panel 400 in a position directly above mode selection switch 404 and in the current embodiment requiring no line to make its association. The physical location of these indicators may vary as contemplated by one of ordinary skill in the art.

SEASONING switch 406 is located in a bottom right side middle area of system status panel 400 and is visually identifiable by the word SEASONING attached to or integrated with system status panel 400 directly beneath seasoning switch 406. Seasoning switch 406 is a three-position momentary switch that is used, when mode selection switch 404 is in the seasoning mode position, to define the start of a seasoning cycle or to terminate a seasoning cycle. Seasoning switch 406, when not used, is seated in a middle position, which is indicative of no change to the seasoning activity taking place. The other two positions of seasoning switch 406 are START 414 and STOP 416. These two positions are made visually ascertainable by the printing of the words START and STOP directly above and to the left and right, respectively, of seasoning switch 406. While the mode switch is in the charge and discharge positions seasoning switch 406 is not used.

System status panel 400 may contain a plurality of LED's. In the preferred embodiment system status panel 400 contains a first set 420 and a second set 430 of LED's. First set of LED's 420 comprise three separate LED's, which indicate what mode standard high volume battery charger 100 is currently in. These three LED's are labeled CHARGE 422, DISCHARGE 424 and SEASON 426, which corresponds with the three different modes available from mode selection switch 404. First set of LED's 420 are located along the left side of system status panel 400 adjacent to mode selection switch 404. If season LED 426 is illuminated then a seasoning cycle is in progress or is awaiting initiation or termination by the corresponding application of seasoning switch, if charge LED 422 is illuminated then a charge is in progress and if discharge LED 424 is illuminated then a discharge is in progress. Second set of LED's 430 comprise five separate LED's, which are labeled correspondingly to indicate readings of 5 V 432 power good, 12 V 434 power good, +12 VR 436 power good, −12 VR 438 power good and summary FAULT 440. Second set of LED's 430 is located along the right side of system status panel 400 adjacent to the seasoning switch 406. These two sets of LED's apply to the entire sub-module on which they are located. Definitions for LED's shown in FIG. 4 are below in Table 6:

TABLE 6

| LED | ON DEFINITION | NOTE |
| --- | --- | --- |
| 5V Power Good | Driven by 5V supply | |
| 12V Power Good | Driven by 12V supply | |
| −12VR Power Good | Driven by DC/DC converter on battery board back panel | |
| +12VR Power Good | Driven by DC/DC converter on battery board back panel | |
| Seasoning Cycle | Mode switch in seasoning position AND start switch has been pressed AND seasoning cycles have not stopped | On during all of the seasoning process. Will be the only LED on during transition delay of seasoning cycle |
| Discharge | Any one of the 8 batteries are being discharged | |
| Charge | Any one of the 8 batteries in pre-qualification or full charge mode (battery charger chip LED1=1, battery charger chip LED2=0) | battery charger chip qualification looks like bulk charge by this definition |
| Fault | Driven by micro-controller | Indicates fault with charging system, not individual battery |

The LED number and location may differ from that shown in the present embodiment. Further, an additional LED may provide indication of entirely new functions such as the status of a battery within a seasoning cycle and the like.

Referring now to FIG. 5 an exemplary method of the present invention for the selection of a seasoning cycle is depicted in method 500. Once power is provided in step 502 to the SHV battery charger it runs through a core initialization in step 504 to determine the status of its own hardware. It scans for attached battery boards, turns all relays off and performs self-tests. This is followed by an application initialization in step 506 where the system reads the mode select switch, sets mode LED, initializes variables according to configuration parameters stored by the micro-controller and sets the charge algorithm and full charge LED according to configuration parameters. Once the system has been checked and set in step 508 it begins the scan loop for all battery boards detected during initialization. As it scans it is checking the batteries in step 510 in order to determine if any one of the batteries has been placed in a reverse position. In step 512, if it has been determined that there is a reversed battery then the battery STATUS LED is Red and the battery PRESENCE LED is Red. This is informing the operator of the reversed condition in order for the operator to correct that condition. The system then loops back and begins the scan loop of step 508 for all battery boards again. If no reversed battery is detected in step 514 the system detects if a battery is inserted. Assuming that a battery is detected, that battery in step 516 is added to the table of batteries present, stored in the micro-controller. Then, in step 518, from the mode select switch the system determines if the battery is to be "Charged", "Discharged" or "Seasoned". If Discharge is detected then the standard high volume battery charger 100, in step 520, applies the discharge algorithm. If Charge is detected then the standard high volume battery charger 100, in step 522, applies the charge algorithm. If standard high volume battery charger 100 detects the mode select switch in the season position, in step 524, it awaits the momentary positioning of the season switch into the start position, thus activating the seasoning algorithm. Upon completion of the selected algorithm application the system cycles back to the begin scan loop directive of step 508 through step 526 which is an end of scan looping function and through step 528 which checks on the operator interfaces such as the mode switches, RS-232 interface and display of voltage/current readings.

Referring now to FIG. 6, an exemplary method of the present invention for the application of a seasoning cycle to a battery is depicted. A seasoning cycle begins with the operator pressing the SEASON switch to START with the mode select switch in the SEASONING position. The number of batteries present is stored in memory for later comparison and application of the seasoning algorithm in step 524 results in the charger, possibly through the use of the micro-controller, determining in hi step 604 if the seasoning cycle has started for the battery. If the seasoning cycle in step 606 has not started for the battery it's STATUS LED is Green and the battery PRESENCE LED is Green and the system returns back to the begin scan loop function as shown in FIG. 5 step 508.

If the seasoning cycle has begun then in step 608 the system determines at what point in the seasoning cycle the batteries are. If a battery is fully charged then the system in step 610 applies a discharge algorithm, which engages the load resistors to discharge the batteries. If a battery is fully discharged then the system in step 612 applies a charging algorithm. In step 614 the system determines if a battery is in the transition delay time (TDT) state. If the battery is not finished with the transition delay state, step 616 indicates this by the battery having a STATUS LED as GREEN and a battery PRESENCE LED as AMBER. If the battery has completed the transition delay state then the seasoning cycle proceeds to step 618. Upon completion of the seasoning cycle either through application of the discharge or charge algorithms the system returns in step 618 by exiting the seasoning algorithm step 524 and proceeding through steps 526 and 528 to eventually return to step 508.

In the exemplary embodiment a seasoning cycle for standard high volume battery charger 100 is initiated by mode selection switch 404 being placed in season position 410. Then seasoning switch 406 is pressed into START 414 position, activating a seasoning cycle. The number of batteries present, as defined by the micro controller and stored in memory for later comparison, is used to define the number of batteries that have to reach the transition delay state in order to switch the batteries from discharge/charge to charge/discharge. In the present embodiment load resistors are engaged to discharge the batteries. A micro-controller monitors the battery voltage until the discharge limit is reached, at which point the battery is disconnected. When the batteries that started the cycle have reached the discharge limit, the transition delay state is entered before beginning the re-charge cycle. This transition delay state is referred to as the transition delay time (TDT). Transition delay time is the time interval set, by configuration parameters, between the completion of a Charge/Discharge cycle and the initiation of a subsequent Discharge/Charge cycle. The re-charging begins, after the transition delay time has elapsed, by connecting the battery to the battery charger chip charger. The charging is controlled by the battery charger chip using the current charging algorithm as defined in the configuration parameters (CHG parameter). Once the battery has been fully charged it has completed the seasoning cycle and is ready for use. The seasoning cycle may be terminated early by pressing seasoning switch 406 to STOP position 416.

It is believed that the standard high volume battery charger of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A battery charging apparatus, comprising:
    a battery cavity for receiving a battery;
    a battery charge module for controlling charging of the battery received in the battery cavity; and
    a port for interfacing a peripheral device capable of displaying battery measurements and inputting commands to the battery charging apparatus,
    wherein the battery charge module is capable of charging and applying a seasoning cycle to the battery.

2. The battery charging apparatus as claimed in claim 1, wherein the port comprises an RS-232 serial port.

3. The battery charging apparatus as claimed in claim 1, further comprising an enclosure.

4. The battery charging apparatus of claim 3, wherein the enclosure further comprises a first sub-module and a second sub-module.

5. The battery charging apparatus of claim 4, wherein each sub-module includes a mode control board and a battery cavity, the mode control board being communicatively coupled with the battery cavity.

6. The battery charging apparatus of claim 4, wherein each battery cavity included within the two sub-modules is capable of receiving eight batteries.

7. The battery charging apparatus of claim 4, wherein the mode control board is communicatively coupled with the port for interfacing the peripheral device and further comprises:
    a system status panel including a plurality of light emitting diodes and at least two switches for enabling charging, discharging and seasoning of the battery, communicatively coupled with the battery charging module; and
    a battery status panel including a plurality of light emitting diodes for indicating detailed battery status information, communicatively coupled with the battery charging module.

8. The battery charging apparatus of claim 1, wherein the battery is a two cell, sealed lead-acid battery for use in a standard high volume product.

9. A battery charging apparatus, comprising:
    at least two battery cavities for receiving a plurality of batteries; and
    a plurality of battery charger modules for controlling charging of the plurality of batteries received in the battery cavity; and
    a port for interfacing a peripheral device capable of displaying battery measurements and inputting commands to the battery charging apparatus,
    wherein the plurality of battery charger modules is capable of charging and applying a seasoning cycle to the plurality of batteries.

10. The battery charging apparatus as claimed in claim 9, wherein the port comprises an RS-232 serial port.

11. The battery charging apparatus as claimed in claim 9, further comprising an enclosure.

12. The battery charging apparatus of claim 11, wherein the enclosure further comprises a first sub-module and a second sub-module.

13. The battery charging apparatus of claim 12, wherein each sub-module includes a mode control board and a battery cavity, the mode control board being communicatively coupled with the battery cavity.

14. The battery charging apparatus of claim 13, wherein the mode control board is communicatively coupled with the port for interfacing the peripheral device and further comprises:
    a system status panel including a plurality of light emitting diodes and at least two switches for enabling charging, discharging and seasoning of the plurality of batteries, communicatively coupled with the plurality of battery charging modules; and
    a battery status panel including a plurality of light emitting diodes for indicating detailed battery status information, communicatively coupled with the plurality of battery charging modules.

15. The battery charging apparatus of claim 9, wherein each of the at least two battery cavities is capable of receiving eight batteries.

16. The battery charging apparatus of claim 9, wherein the plurality of batteries are a plurality of two cell, sealed lead-acid batteries for use in a standard high volume product.

17. A battery charging apparatus, comprising:
    means for receiving a battery; and
    means for controlling charging of the battery received in the battery receiving means; and
    means for interfacing a peripheral device capable of displaying battery measurements and inputting commands to the battery charging apparatus,
    wherein the charging controlling means is capable of charging and applying a seasoning cycle to the battery.

18. The battery charging apparatus as claimed in claim 14, wherein the receiving means further comprises:
    an enclosure;
    a sub-module disposed within the enclosure, including a mode board; and
    a battery cavity, for receiving a battery, communicatively coupled with the mode board.

19. The battery charging apparatus as claimed in claim 14, wherein the controlling means comprises:
    a battery charger module for controlling charging of the battery received in the battery cavity, disposed within the battery cavity, wherein the battery charger module is capable of charging and applying a seasoning cycle to the battery.

* * * * *